Jan. 24, 1967 J. S. DAVIS ET AL 3,300,767

WOVEN SCREEN MAGNETIC STORAGE MATRIX

Original Filed Aug. 30, 1960

PAUL E. WELLS
JOHN S. DAVIS
INVENTORS

BY [signature]
ATTORNEYS 3,300,767
Patented Jan. 24, 1967

3,300,767

WOVEN SCREEN MAGNETIC STORAGE MATRIX

John S. Davis, Glendale, and Paul E. Wells, Los Angeles, Calif., assignors, by mesne assignments, to The Bunker-Ramo Corporation, Stamford, Conn., a corporation of Delaware Continuation of application Ser. No. 53,008, Aug 30, 1960. This application June 29, 1964, Ser. No. 380,982
28 Claims. (Cl. 340—174)

This invention relates to information storage devices and more particularly to a new and improved information storage device employing an array of magnetizable elements. This application is a continuation of application Serial No. 53,008, filed August 30, 1960, now abandoned.

Magnetic cores of a material exhibiting a substantially rectangular hysteresis loop are frequently employed as storage elements in random access memory arrangements, such as in digital computers and similar equipment. However, a number of disadvantages have become apparent which preclude magnetic cores from being considered ideal for use in a fast, efficient and cheap random access memory for digital computers. For example, the cores are fragile and temperature sensitive and are difficult to fabricate with uniform characteristics. To provide memory elements having faster switching times, cores have been made smaller and switching power has been stepped up. However, the assembly of a memory utilizing cores requires a great deal of labor inasmuch as each core must be individually threaded with the wires required for information entry and readout. Moreover, dissipating the heat accompanying increased switching power is difficult.

A number of prior art arrangements have been devised in an attempt to overcome the above mentioned difficulties connected with magnetic cores. The thin film memory in which a magnetic material is plated to a substrate is one such arrangement but is not without its own disadvantages. For example, suitable coupling between the drive leads and the individual information storage elements is difficult. Heat dissipation is a problem and adhesion of the magnetic material to the substrate is difficult to control. Furthermore, even where the individual information storage elements are provided by the thin film, the fabrication of a high capacity memory requires the addition of conductors for the entry and readout of information so that the amount of labor involved in assembling the device is still quite large.

Accordingly, it is an object of this invention to provide a new and improved information storage device.

More particularly it is an object of this invention to provide a fast and efficient random access memory.

It is a further object of this invention to provide an information storage device which is simple to fabricate, reliable in operation and free from temperature sensitivity.

In accordance with the invention a woven screen of filamentary members is employed as a framework for an information storage device which is formed by plating or otherwise depositing remanently magnetic material on the screen. A matrix of individual memory elements is provided by the remanently magnetic material surrounding the meshes of the screen. Electrical connection wires for controlling and sensing the state of magnetization of the individual memory elements may be threaded through the screen meshes as desired or alternatively may be interwoven during the fabrication of the screen itself prior to the plating process.

The invention enables a random access memory to be provided which is extremely simple to fabricate. At the same time the individual elements are small and the matrix may be compactly arranged so that a large capacity memory can be built in a small space. Further, in accordance with an aspect of the invention wherein woven wires are employed, the screen wires which support the matrix may be constructed of materials which are good heat conductors so as to solve the problem of heat dissipation. In addition, the wires of the screen provide an excellent equipotential surface to enhance the electrostatic shielding characteristics of the memory.

While the structure of the invention may be provided by plating remanently magnetic material directly over a copper screen, improved uniformity of the individual memory elements results from the bonding of the intersections of the bare screen wires prior to plating with the remanently magnetic material. This may be accomplished, for example, by plating with a suitable material, by solder dipping, or by rolling the screen under pressure. The bonding step advantageously establishes uniform electrical connections at all the wire intersections and provides for a uniform reluctance path throughout the magnetic memory elements formed when the remanently magnetic material is plated on the screen.

In one specific embodiment of the invention a segment of woven screen is solder dipped to provide uniform electrical connections at all of the intersections of the wires. Thereafter, the screen is plated with a suitable material to provide magnetic elements in the form of closed loops extending around the openings of individual ones of the screen meshes. Orthogonal electrical control and sense leads may then be threaded through selected ones of the individual memory elements to establish a memory matrix which is capable of storing information as a function of the magnetization states of the magnetic elements. Isolation between individual elements can be provided by selectively controlling the location of the plating material or by spatially separating the control and sensing leads so that adjoining memory elements are not utilized.

In another specific embodiment of the invention, the control leads of the magnetic memory are interwoven with the filamentary members of the screen prior to the addition of the magnetic material. Plating of a remanently magnetic material over the screen filaments then provides a matrix of individual magnetic memory elements through which the drive leads are already threaded.

In another embodiment of the invention a fabric of insulated wires is provided and remanently magnetic material is selectively deposited at the intersections of the wires only. In this embodiment an individual magnetic storage element is formed by the remanently magnetic material deposited at each intersection.

In each of the above mentioned embodiments of the invention, storage and readout of an individual bit of information in a selected individual element may be achieved by the application of coincident drive currents to selected control leads in each of the two orthogonal directions, as is well known in the art.

A better understanding of the invention may be had from a reading of the following detailed description taken in conjunction with the drawings in which.

Figure 8:
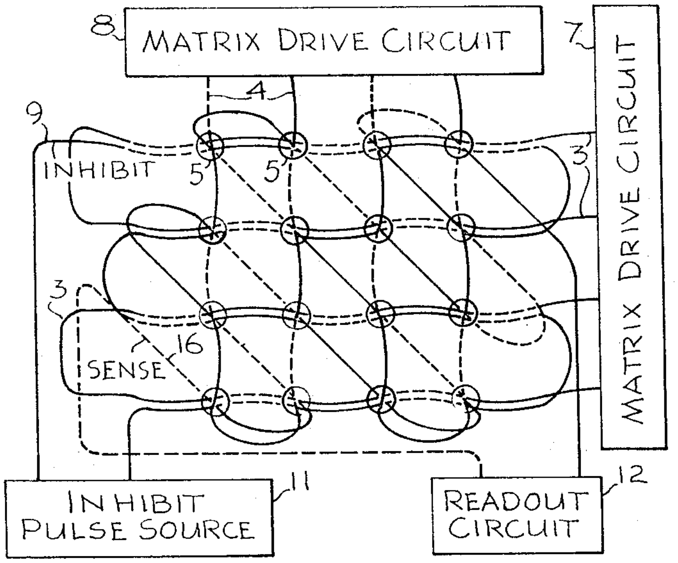
Figure 7:
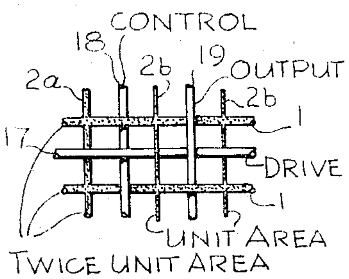

FIGURE 7 is an enlarged fragmentary plan view of an information storage device in which two adjacent meshes of a screen are employed as an information storage element; and FIGURE 8 is a schematic representation of an exemplary arrangement of control conductors which may be employed in conjunction with an information storage device in accordance with the invention for the purpose of entering and reading out information.

Figure 1:
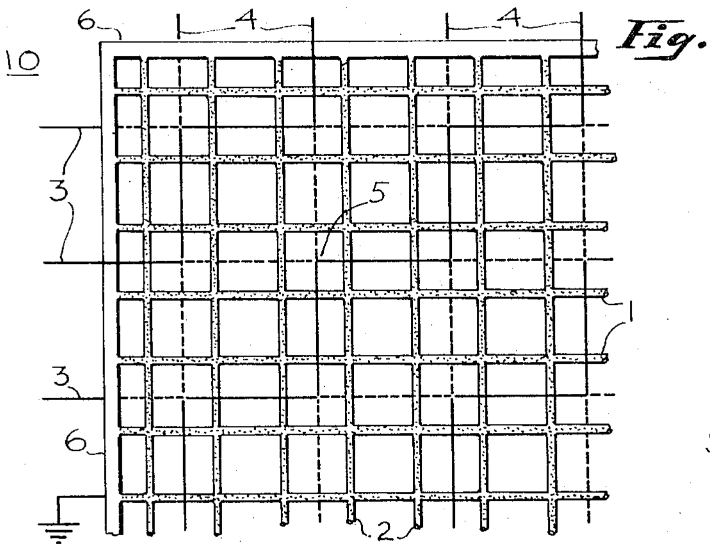
FIGURE 1 is an enlarged fragmentary plan view of one particular embodiment of an information storage device in accordance with the invention.

In FIGURE 1 a portion of one particular embodiment of an information storage device in accordance with the invention is depicted in which horizontal and vertical wires 1 and 2, of an electrically conductive material, such as copper, have been woven together in the manner of a wire screen. The screen of the wires 1 and 2 may be dipped in a molten metal conductor, such as solder, to establish suitable electrically conducting joints at all of the intersections of the wires. Thereafter, the dipped screen may be plated with a remanently magnetic material, such as permalloy, so that each of the individual meshes of the plated wire screen forms a closed loop of remanently magnetic material which may, in accordance with the invention, serve as an individual magnetic memory element similar to a magnetic core. In the embodiment of the invention depicted in FIGURE 1, a single mesh of which is shown in detail in FIGURE 2, horizontal drive leads 3 and vertical drive leads 4, each of which may be advantageously coated with an insulating material, are threaded in orthogonal directions through selected ones of the individual magnetic memory elements 5 corresponding to the meshes of the plated screen 10. The drive leads 3 and 4 are shown passing over and under respective portions of the screen matrix 10, the dotted lines indicating portions of the drive leads 3 and 4 beneath the plane of the screen 10.

Running along the edge of the screen matrix 10 and in contact with each of the horizontal and vertical wires 1 and 2 is a frame 6 which advantageously serves, in accordance with the invention, to conduct heat away from the individual screen wires 1 and 2, thus improving the performance of the screen memory matrix 10 by providing for its operation at a reduced ambient temperature. The frame 6 may be provided if desired, in accordance with techniques known in the art, with ducts or fins for cooling by means of suitable fluid circulation. In addition, the frame 6 may be connected to a reference potential, or ground, so that the entire matrix 10 functions as an electrostatic shield.

Figure 2:
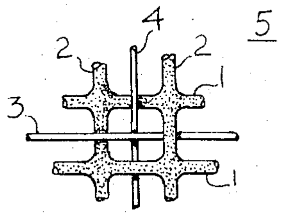
FIGURE 2 is an enlarged fragmentary view of a portion of the information storage device of FIGURE 1, illustrating an arrangement of control wires in a single magnetic element.

In FIGURE 2 an individual memory element 5 of the arrangement of FIGURE 1 is shown comprising the plated screen wires 1 and 2 through which the drive leads 3 and 4 are threaded. By passing currents from left to right and from top to bottom in the leads 3 and 4, respectively, coincident magnetic fields are established in a clockwise direction about the element 5. When these currents are terminated, the remanent property of the material serves to maintain the magnetization in a clockwise direction, thus corresponding to the storage of a binary digit, or bit of information of one given value. Similarly, currents in the reverse directions along the leads 3 and 4 serve to establish a magnetization in a counter-clockwise direction which represents the storage of a binary digit of opposite value.

It will be noted in FIGURE 1 that the spacing of the respective drive leads 3 and 4 is such that the adjacent memory elements are separated by meshes of the screen 10 which are not employed as memory elements. Spatial separation in this fashion serves to provide isolation between adjacent memory elements so that a change of magentization in one element will not adversely affect the state of the magnetization of the adjacent elements.

Figure 3:
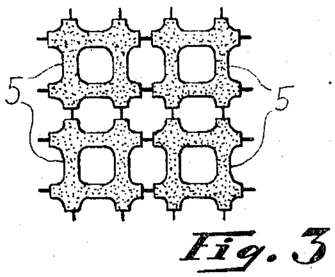
FIGURE 3 is an enlarged fragmentary view of an information storage device in accordance with the invention in which the magnetic storage elements are separated from each other.

FIGURE 3 illustrates an alternative arrangement in accordance with the invention, wherein the desired isolation between adjacent memory elements is afforded in a different manner from that depicted in FIGURE 1. In FIGURE 3, a plurality of individual memory elements 5 are shown disposed along alternate mesh rows and columns of the screen matrix. This arrangement may be formed by plating a plurality of wires of a screen as described in connection with FIGURE 1 and thereafter selectively etching away the remanently magnetic material between adjacent rows and columns of the individual memory elements. Thus, the magnetic material is removed from between adjacent memory elements and the desired magnetic isolation is provided. Control leads may be added to the arrangement in FIGURE 3 by threading the apertures of the element 5 as shown in FIGURES 1 and 2 and described above.

Figure 4:
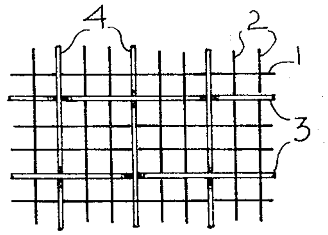
FIGURE 4 is an enlarged fragmentary plan view of an information storage device in accordance with the invention in which the control wires are woven into the screen.

FIGURE 4 illustrates another alternative arrangement in accordance with the invention in which both the control leads and the screen wires which form the grid of the memory matrix are woven together in a single structure. During the fabrication of such an arrangement, an insulated lead such as 4 is interwoven between the bare wire conductors.

The screen may then be bonded and plated as described above with the plating depositing a layer of remanently magnetic material only on the bare wires such as 1 and 2. Thus, individual magnetic memory elements are provided which are already threaded with insulated control leads, such as the wires 3 and 4, and which are isolated from one another by the intervening meshes of the screen. Thus, the added expense of threading the individual magnetic memory elements after plating of the screen is eliminated and an information storage device is provided which may have a substantially finer mesh than would otherwise be possible where the control leads must be manually threaded through the magnetic storage elements.

Figure 5:
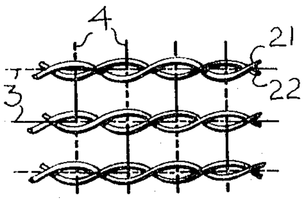
FIGURE 5 is an enlarged fragmentary view of an information storage device in accordance with the invention in which the screen wires are interwoven in an alternating pattern so as to reduce the magnetic field interference between adjacent storage elements.

Although a particular weave pattern of the screen wires is illustrated in FIGURES 4—4, it will be appreciated that other patterns may be used as well. For example, FIGURE 5 depicts a pattern, similar to a basket weave, which advantageously diminishes the magnetic field interference between memory elements by reducing the proportion of magnetic material which is common to adjacent elements. In FIGURE 5 the wires such as 21 and 22 are interwoven in an alternating pattern to form rows of apertures which provide magnetic storage elements when plated with a suitable material. The control leads 3 and 4 are threaded in orthogonal directions through the aperture formed between the screen wires as shown to afford coincident coordinate selection of particular elements.

Figure 6:
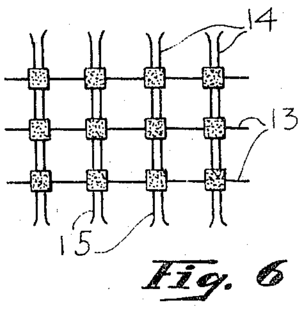
FIGURE 6 is an enlarged fragmentary plan view of an information storage device in accordance with the invention in which the magnetic storage elements are deposited at the intersections between the screen wire.

FIGURE 6 illustrates a portion of another alternative arrangement of the invention in which a plurality of insulated conductors 13, 14 and 15 are woven in the form of a screen and serve both as a supporting structure and as the control leads of the respective memory elements. A remanently magnetic material is then deposited at the intersections of the wires 13, 14 and 15 so that the remanently magnetic material encompasses these wires at each intersection.

In the operation of the embodiment of the invention depicted in FIGURE 6, a particular bit of information may be stored at the memory element of a particular intersection by applying appropriate pulses to selected ones of the conductors 13 and 14. The corresponding coincident drive currents produce a resultant magnetic field which establishes a remanent magnetization directed at 45° from the drive leads 13 and 14. Sensing leads such as 15 may be used to detect the remanent magnetization state of a particular element when it is switched destructively by current flow of a reverse polarity through the conductors 13 and 14. Alternatively, a pulse may be applied to a single conductor 13 which temporarily rotates the remanent magnetization of the associated elements so as to produce signals on the sensing leads 15 indicative of the existing magnetization states without reversing those states. Thus, this embodiment of the invention advantageously affords either destructive or nondestructive magnetic memory element readout, depending on the type of control which is employed.

The various embodiments of the invention described above involve matrices of memory elements which operate in a manner similar to single-apertured magnetic cores. However, it will be clear to those skilled in the art that the fabrication techniques of the invention may be employed to provide arrangements which perform the functions of other types of cores. For example, FIGURE 7 depicts a fragmentary portion of an arrangement in accordance with the invention which operates in the manner of a particular multiapertured core device, sometimes referred to as the transfluxor. As in the example of FIGURE 1, a large number of elements of the type illustrated in FIGURE 7 may be connected in a matrix having a size corresponding to the amount of information to be stored.

In FIGURE 7, horizontal screen wires 1 and vertical wires 2*a* and 2*b* are shown comprising a double-apertured memory element. By selectively dimensioning the wires 1 and 2, then plating thereover with a remanently magnetic material in the manner described above, the thickness of the plating layer and thereby the cross-sectional area of the resulting memory element may be made to vary in different portions thereof. In the embodiment of FIGURE 7, the portions of the element represented by the designation 2*b* have one cross-sectional area while the portions represented by the designations 1 and 2*a* have twice that cross-sectional area. When the apertures formed by the wires 1, 2*a* and 2*b* of FIGURE 7 are threaded by suitable insulated leads 17, 18 and 19, a double-apertured magnetic memory device is provided which is capable of functioning in the same manner as the device known as a transfluxor within which currents through the control lead 18 establish preset conditions of magnetization within the portions designated 2*b*. Output voltages appear on the lead 19 in accordance with the preset conditions of magnetization in response to current flow through the drive lead 17.

FIGURE 8 is a schematic representation of appropriate control circuitry which may be employed in connection with an information storage device in accordance with the invention. In FIGURE 8, the horizontal drive leads 3 and the vertical drive leads 4 are connected to the matrix drive circuits 7 and 8, respectively, and serve to provide the coincident selection of the individual memory elements such as 5. If desired, an inhibit winding 9 connected to an inhibit pulse source 11 may also be employed in the same manner as in well known core memory systems. In FIGURE 8 a sense winding 16 connected to a readout circuit 12 is shown threading all of the individual memory elements 5. A voltage appears on the sense winding 16 whenever the magnetic state of one of the elements 5 is interrogated by the application of pulses to the horizontal and vertical drive leads 3 and 4.

Magnetic memory screens in accordance with the invention may be fabricated in a number of different ways. However, the use of preferred techniques in the preparation of the screens leads to improved results in the operation and performance of the finished memory structure. It is essential from the standpoint of performance of the finished structure that all of the individual memory elements exhibit uniform magnetic properties. A rectangular hysteresis loop and a low coercive force for the individual elements are desirable. In a conventional magnetic memory screen these considerations demand that the remanently magnetic material be deposited with uniform thickness and composition throughout the screen, including all of the individual portions of the separate mesh elements.

The process to be followed in fabricating a magnetic memory screen depends in part upon the composition of the basic screen. The screen may be constructed of any metal that serves as a good conductor or, if woven of nonconductors, it may be rendered conductive by conventional methods such as depositing a thin film of electroless copper. This last step is unnecessary for a woven screen of non-conducting filamentary members, such as Teflon or nylon, if the deposition of the remanently magnetic material is to be effected by methods other than electroplating, as, for example, by vapor deposition or the like. As already mentioned, the sense wires may be woven into the screen or they may be threaded subsequent to plating with the remanently magnetic material. It is usually desirable, but not essential, to bond the corners of the screen meshes as, for example, by electroplating with a non-magnetic material.

Where the sense wires are woven into the screen or threaded therein before processing, the insulation on the sense wires should be inert to the cleaning compounds and to the conditions of the electroplating or electroless plating bath. In case the screen is to be heat treated, it is also desirable that the sense wires should be able to withstand annealing temperatures as high as 1000° C. Such wires may be provided by depositing a thin film of nickel or cobalt phosphide upon a conducting wire such as copper, and by wrapping this with thin threads of asbestos fiber. Alternatively, the wire may be threaded through fine quartz or may have a ceramic coating deposited thereon.

Where desired, magnetic annealing may be performed by passing an adequate current along the sensing wires during the process of deposition of the remanently magnetic material. Rectangularity of the hysteresis loop and a reduction in coercive force of the material may be effected by the conventional heat treatment of magnetic materials to a temperature of about 1000° C. in a reducing or inert atmosphere and by subsequent cooling. Grain orientation of the magnetic material may be facilitated by performing this process in the presence of a magnetic field, as for example, by the field generated by passing a weak current through the sensing wires.

During the electroplating of the remanently magnetic material, the screen which is to be plated may be connected as a cathode and arranged in substantially parallel juxtaposition with another screen connected as an anode. The two screens are stretched in special holder frames which are mounted in a plexiglass cradle. This cradle has parallel adjustment slots to facilitate alignment of the electrodes and thus insure uniformity of the plating.

The problems of attaining a uniform electrodeposit are well known to those skilled in the art. The tendency of the potential field to concentrate at the corners of a cathode may be offset by distortion of the anodes to compensate for the variations in current density. However, calculations of the theoretical current distribution over a cathode of extended area is complicated and rarely relates adequately to the practical attainment of the desired uniformity.

In electroplating magnetic memory screens in accordance with the invention, special techniques for improving the uniformity of the plating have been devised. These special techniques permit an actual determination of the current variation throughout the extent of the screen which determination is more accurate and may be performed in much less time than the calculation of theoretical current distribution over the cathode.

In one arrangement a sectionalized test screen of similar area and type to the screen which is to make up the memory is prepared upon a plastic support. Each small screen which is a part of the over-all test screen is fastened to the plastic by means of nylon thread and electrically connected by means of individual leads to the power source. An ammeter is inserted in series with each screen section to measure the current carried thereby without distorting the current distribution over the remaining screen surface area. The resulting current measurements may be plotted to provide a graphical representation of the existing current distribution. It will be clear to those skilled in the art that this distribution may be ascertained in this manner with as great a degree of precision as desired simply by dividing the overall screen area into individual sections of suitably small dimensions. Once the current distribution is determined in this manner, the anodic screens are then distorted to shapes which result in a more uniform current distribution, thus providing more uniform plating upon the main screen which is placed in the position occupied by the sectionalized screen during the determination of the current distribution. In addition to distorting the anodic screens for this purpose, auxiliary anode screen sections may be added in order to produce the desired current distribution.

Solutions having different compositions of nickel and iron may be employed for electroplating the remanently magnetic material on the magnetic memory screen of the invention. Among these compositions are 79% nickel/21% iron, 82% nickel/18% iron, 65% nickel/35% iron, 61% nickel/39% iron, and 50% nickel/50% iron. The alloys resulting from plating with such compositions exhibit a low coercive force which is suitable for the magnetic screen memory and may be electroplated from a "Wolf Permalloy" plating bath. In addition, low stress permalloy may also be deposited from a sulfamic acid bath. Critical concentrations of the plating solution may be maintained by the addition of ferrous salts to the large volume of electrolyte during the plating process. Alternatively, permalloy of the required composition may be first deposited upon a stainless steel screen which is utilized as the anode screen. It has been found that low coercive force in the plated material is associated with low current density in the case of the Wolf Permalloy plating bath.

The 71/21%–82/18% range of nickel/iron alloys is associated with almost zero magnetostriction, and where this property is essential, the remanently magnetic material may be plated from a composition in this range. However, in practice, plating with a 61/39% alloy is easier to control and seems to offer the best compromise with regard to uniformity and reliability.

By way of example, the construction of one specific arrangement of the invention will be described in detail. A 40 mesh screen of 30 gauge bare copper wires .005 inch to .007 inch in diameter may be employed with each individual mesh of the screen being approximately .025 inch square. A smooth surface on the copper is desirable, and electropolishing is a good means of achieving such a smooth surface. After the screen has been thoroughly cleaned of all organic contamination, it is degreased in trichloroethylene vapor, rinsed in distilled water, immersed in 50% hydrochloric acid, rinsed and then flashed with a thin film of gold from an acid or cyanide gold plating bath. The gold plating serves to protect the screen from oxidation effects and to yield a smoother substrate for the base of the remanently magnetic layer. In one specific arrangement, the layer of gold plating advantageously is approximately .0002 inch thick. Gold plated from a cyanide bath should be activated in a 5% sulfuric acid solution prior to the subsequent electroplating.

In the described specific arrangement, insulated wires of approximately .003 inch diameter, preferably coated with Teflon, are next threaded through the meshes selected to serve as memory elements. Following the threading of the elements, the screen is plated to a thickness of approximately .000125 inch with a 61/39% nickel-iron alloy. In general, the thickness of the layer of remanently magnetic material may vary from .000125 inch to .0008 inch depending upon the composition of the material.

Although exemplary embodiments of the invention have been illustrated and described, it will be understood that the invention is not limited thereto. Accordingly, the accompanying claims are intended to include all equivalent arrangements falling within the scope of the invention.

The embodiments of the invention in which an exclusive property or privilege is claimed are defined as follows:

1. A magnetic memory device comprising a screen of filamentary members interwoven in a predetermined mesh pattern, a layer of remanently magnetic material in intimate contact with each of said filamentary members to form closed loops of said material about open meshes of the screen, and means for selectively determining the magnetization states of the loops comprising insulated conductors selectively threaded through certain of said meshes.

2. A magnetic memory device comprising a first plurality of filamentary members in a parallel array, a second plurality of filamentary members substantially orthogonal to the filamentary members of said first plurality and interwoven therewith so that the filamentary members of the second plurality alternate from side to side of the filamentary members of the first plurality in crossing thereover remanently magnetic material deposited selectively on both pluralities of filamentary members about meshes of the screen of said interwoven first and second pluralities of filamentary members, and means for determining the remanent magnetization states of particular portions of said material.

3. A magnetic memory device comprising a screen of filamentary members interwoven in a predetermined pattern and remanently magnetic material selectively deposited thereon to form at least one individual storage element having a closed magnetic path about an open mesh of said screen.

4. A magnetic memory device comprising first and second pluralities of filamentary members interwoven in a predetermined pattern, magnetic material of a type exhibiting a plurality of remanent magnetization states deposited to establish storage cells having closed magnetic paths about selected filamentary members, and means for determining the remanent magnetization states of particular portions of said material.

5. A magnetic memory device comprising a screen of bare conducting wires interwoven in a predetermined mesh pattern, a layer of remanently magnetic material in intimate contact with each of said wires to form closed loops of said material about open meshes of the screen, and means for selectively determining the magnetization states of the loops comprising insulated conducting wires threaded through certain of said meshes.

6. A magnetic memory device comprising a plurality of bare conducting wires interwoven to form a screen, a plurality of insulated conducting wires also interwoven in the screen in a repetitive pattern with the bare conducting wires, a layer of remanently magnetic material individually enveloping the bare conducting wires to establish closed loops of said material surrounding selected intersections of the insulated conducting wires, and means connected to the insulated conducting wires for selectively controlling the magnetization states of said closed loops.

7. A magnetic memory matrix comprising a plurality of individual memory elements each including remanently magnetic material plated in a layer on adjacent pairs of orthogonal bare wires interwoven to form a screen, each said memory element comprising a closed loop of said material surrounding a corresponding mesh of said screen, and insulated conductors threaded alternately on opposite sides of said screen through selected ones of said meshes.

8. A magnetic memory device comprising a first plurality of conducting wires in a parallel array, a second plurality of conducting wires substantially orthogonal to the wires of said first plurality and interwoven therewith so that the wires of the second plurality alternate from side to side of the wires of the first plurality in crossing thereover, remanently magnetic material deposited selectively to define closed loop magnetic paths in the screen of said interwoven first and second pluralities of wires, and means for determining the remanent magnetization states of particular portions of said material.

9. A magnetic device comprising a screen of electrically conducting wires interwoven in a predetermined pattern and remanently magnetic material selectively deposited about meshes of said screen.

10. A magnetic memory device comprising first and second pluralities of conducting wires interwoven in a predetermined pattern, magnetic material of a type exhibiting a plurality of remanent magnetization states deposited selectively in closed magnetic paths about respective ones of said conducting wires, and means for determining the remanent magnetization states of particular portions of said material.

11. A magnetic memory device comprising a plurality of conducting wires arranged in the form of a screen, a layer of a material exhibiting a plurality of stable remanent magnetization states selectively plated on said screen to form a plurality of magnetic memory elements incompassing particular meshes of said screen, and means for selectively controlling the magnetization states of the corresponding magnetic memory elements.

12. A magnetic memory device in accordance with claim 11 wherein said last-mentioned means comprises a plurality of insulated conducting wires individually threading said magnetic memory elements.

13. A magnetic memory device in accordance with claim 11 wherein the material of said layer comprises an alloy of 61% nickel/39% iron and said layer is approximately .000125 inch thick.

14. A magnetic memory device in accordance with claim 11 wherein said material is permalloy and the plated layer is of the order of .0005 inch thick.

15. A magnetic memory device comprising a plurality of insulated conductors interwoven to form a screen, a plurality of magnetic memory elements comprising remanently magnetic material deposited only at the intersections of pairs of orthogonal conductors in said screen, each of said magnetic memory elements comprising a material exhibiting a plurality of stable remanent magnetization states, and means for selectively energizing the insulated conductors in order to determine the magnetization states of individual ones of the magnetic memory elements.

16. A magnetic memory device in accordance with claim 15 wherein two insulated conductors are woven in one direction for each insulated conductor woven in the direction orthogonal thereto and each magnetic memory element encompasses two of the insulated conductors in one direction and one of the insulated conductors in the direction orthogonal thereto at the intersection thereof.

17. A magnetic memory device in accordance with claim 16 wherein one of said two insulated conductors comprises a drive lead for its associated magnetic memory elements and the other of said two insulated conductors comprises a sensing lead for said associated magnetic memory element.

18. A magnetic memory device comprising a plurality of conducting wires arranged in the form of a screen, a plurality of magnetic memory elements at particular positions in said screen comprising a material exhibiting a plurality of stable remanent magnetization states, means for selectively controlling the magnetization states of individual ones of said magnetic memory elements, and heat conducting means connected to said screen wires for dissipating heat therefrom.

19. A magnetic memory device comprising a plurality of conducting wires arranged in the form of a screen, means for electrically connecting all of said wires, a plurality of magnetic memory elements at particular positions in said screen comprising a material exhibiting a plurality of stable remanent magnetization states, means for selectively controlling the magnetization states of individual ones of said magnetic memory elements, and a reference potential for grounding said wires to provide an electrostatic shield.

20. A magnetic memory device comprising a plurality of conducting wires arranged in the form of a screen, a plurality of magnetic memory elements at particular positions in said screen comprising a material exhibiting a plurality of stable remanent magnetization states deposited on said wires, means for selectively controlling the magnetization states of individual ones of said magnetic memory elements, and means for minimizing magnetic interference between said magnetic memory elements.

21. A magnetic memory device in accordance with claim 20 wherein said means for minimizing magnetic interference comprises mesh rows of said screen spatially separating said memory elements.

22. A magnetic memory device comprising a screen of conductors interwoven in a predetermined mesh pattern, said conductors being comprised at least in part of remanently magnetic material to form closed magnetic loops about open meshes of the screen, and means for selectively determining the magnetization states of the loops comprising insulated conducting wires threaded through certain of said meshes.

23. A magnetic memory device comprising a plurality of conducting wires arranged in the form of a screen, certain of said wires having a different cross-sectional area from others of said wires, a plurality of magnetic memory elements, each including wires of disparate cross-sectional areas, at particular positions in said screen comprising a material exhibiting a plurality of stable remanent magnetzation states deposited on said conducting wires, and means for selectively controlling the magnetization states of individual ones of said magnetic memory elements.

24. A magnetic memory device comprising a screen having wires woven in substantially orthogonal directions, a magnetic material exhibiting a plurality of stable remanent magnetization states deposited over said wires to define closed loop memory elements including predetermined sections of said screen wires, and means for selectively determining the remanent magnetization states of said memory elements.

25. A magnetic device comprising a plurality of wires interwoven to form a screen, a layer of a remanently magnetic material selectively deposited on said wires to form individual switching elements, and elements having different cross-sectional areas of said remanently magnetic material in different portions thereof, and means for selectively magnetizing particular portions of said switching elements.

26. A magnetic device in accordance with claim 25 wherein said wires are of different diameter.

27. A magnetic device in accordance with claim 25 wherein said switching elements each include a plurality of meshes of the screen and so have each a plurality of apertures.

28. A magnetic device in accordance with claim 27 wherein said magnetizing means comprises insulated conducting wires threading particular apertures of said elements.

References Cited by the Examiner

UNITED STATES PATENTS

| | | | |
|---|---|---|---|
| 2,919,434 | 12/1959 | Mestre | 307—88 X |
| 3,083,353 | 3/1963 | Bobeck | 340—174 |
| 3,099,874 | 8/1963 | Schweizerhof | 340—174 |

BERNARD KONICK, *Primary Examiner.*

IRVING SRAGOW, *Examiner.*

R. J. McCLOSKEY, S. M. URYNOWICZ, *Assistant Examiners.*